Oct. 23, 1934.    M. KNOBEL    1,977,966
SELF STARTING SYNCHRONOUS MOTOR
Filed April 30, 1932
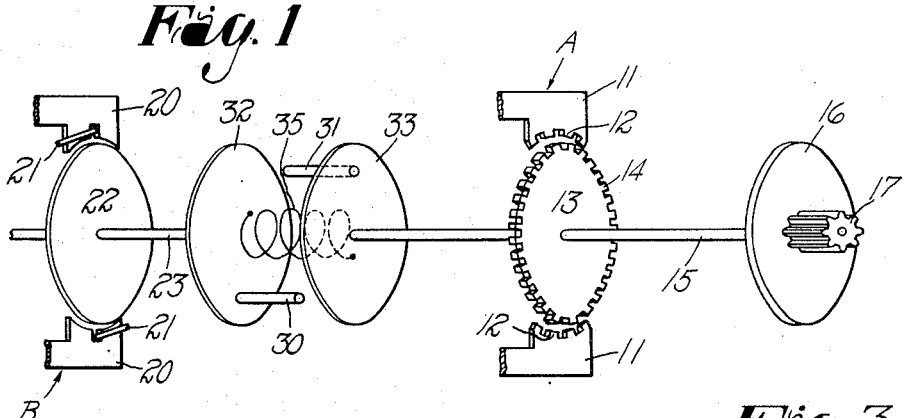
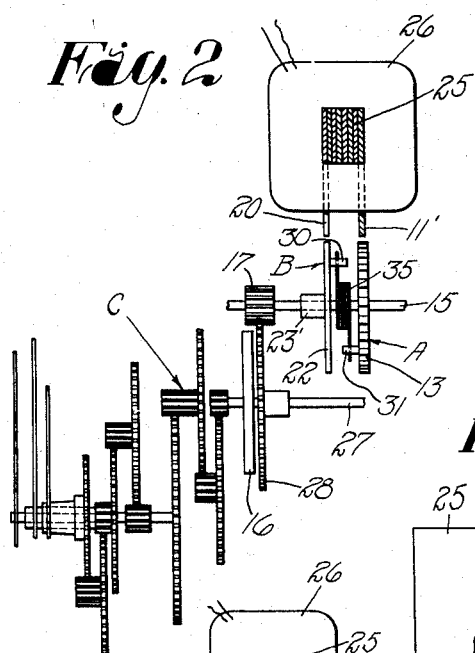
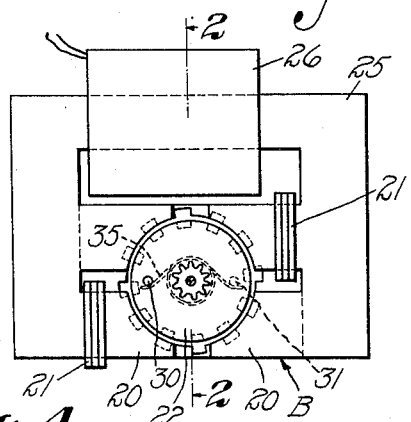
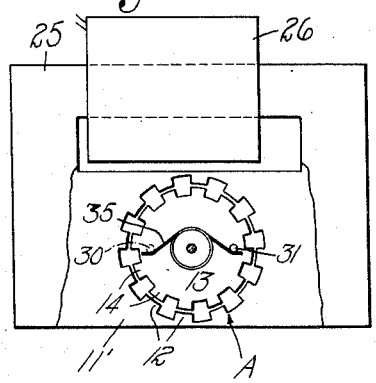
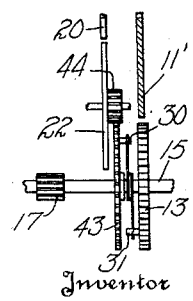
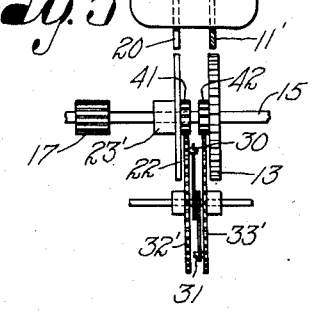
Inventor
Max Knobel Patented Oct. 23, 1934

1,977,966

UNITED STATES PATENT OFFICE 1,977,966

SELF-STARTING SYNCHRONOUS MOTOR

Max Knobel, Arlington, Mass., assignor to Barss, Knobel & Young, Inc., Cambridge, Mass., a corporation of Massachusetts Application April 30, 1932, Serial No. 608,462

3 Claims. (Cl. 172—279)

This invention relates generally to self-starting synchronous motors. As an instance of a use to which motors constructed in accordance with the present invention may be applied, reference may be had to the driving of small mechanisms, such as clocks and the like.

It is well known that a synchronous motor unit, such as the type having a toothed rotor, has strong synchronizing characteristics which permit it to be used for driving timing mechanisms and the like with the greatest accuracy, but such units have weak or negative starting characteristics and, therefore, require that they either be started manually, or automatically through some supplemental means. It is also well known in the art that an induction motor of the non-synchronous type, such as one having a plain disk as a rotor, has stronger starting characteristics (that is, a greater starting torque) than such synchronous units, but such an induction motor has little or no synchronizing characteristics. It has been proposed to combine a synchronous motor unit and a non-synchronous induction motor unit in order that the latter may start the former, and with the thought that after the rotor of the synchronous unit has been brought to synchronous speed it will retain that speed, but such arrangements are open to numerous objections and disadvantages both from the structural and operating standpoints.

The aim of the present invention is to provide an improved arrangement which includes a synchronous motor unit, and an induction motor unit for automatically starting the same and which arrangement is not open to certain objections and disadvantages incident to, or inherent in, arrangements heretofore proposed.

More particularly, an aim of the invention is to provide an improved arrangement which is characterized by its extreme simplicity in construction, its economy in manufacture, and by its effectiveness in operation. With my improved arrangement, the induction motor unit may be relatively light and is so associated with the rotor of the synchronous motor unit that the latter will be started from rest with assurance and nicety and, after the synchronous motor unit has been brought to the desired speed, it will retain that speed without interference by the induction motor.

Other objects will be obvious, and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein I have shown, for illustrative purposes, one embodiment which the present invention may take, Fig. 1 is a view showing, more or less diagrammatically, my improved arrangement;

Fig. 2 discloses a commercially practical embodiment of the invention as applied to a clock or timing mechanism, the motor being shown in transverse section, substantially on line 2—2 of Fig. 3;

Fig. 3 is a view of the motor shown in Fig. 2;

Fig. 4 is a view similar to Fig. 3, the rotor and pole pieces of the non-synchronous unit being broken away;

Fig. 5 is a view somewhat similar to Fig. 2, but showing another embodiment of the invention; and Fig. 6 is a view showing another embodiment.

Referring to the drawing in detail, and particularly to Fig. 1, A denotes generally a synchronous motor unit of a well known type. It is shown in Fig. 1 as having a stator provided with a pair of pole pieces 11 having spaced extensions or teeth 12. The rotor, designated by the numeral 13, may have about its periphery a plurality of equally spaced apart projections or teeth 14. The rotor is fixed to a shaft 15, which may carry an inertia wheel 16. For illustrative purposes, the shaft is shown as carrying a pinion 17 which represents a part of the load, and which load may be in the form of a timing mechanism or other suitable device to be driven. The letter B designates, generally, the non-synchronous motor unit which includes the pole pieces 20. These pole pieces are divided, and portions thereof are provided with shading coils 21 so as to produce a rotating field. The rotor of the non-synchronous motor unit is in the form of a disk 22 which, in Fig. 1, is shown as being mounted on a shaft 23.

In the embodiments shown in Figs. 2 to 4, inclusive, the stator 11' of the synchronous motor unit is in the form of a plate having an opening provided with the projections or teeth 12. This plate constitutes one of the end laminations of the core 25 about which is the coil 26. The stator 20 of the non-synchronous unit is also in the form of a plate having a portion forming the other end lamination of the core. The disk rotor 22 has a sleeve 23' journalled on the shaft 15. In this embodiment, the load is shown as being in the form of a clock mechanism, designated generally by the letter C, and which has a first shaft 27 to which is fixed a gear 28 meshing with the pinion 17. If desired, an inertia wheel 16 may be fixed to this first shaft 27. The two motor units are generally of well known constructions, and may take any suitable forms, the forms shown being by way of illustration only.

In order that the improvements of the present invention may be more fully understood, it may be here stated that the toothed rotor 13 is more or less magnetically locked in its position of rest when the current is thrown on. Obviously, the disk rotor of the non-synchronous unit could be connected more or less directly to the toothed rotor 13 and have a sufficient starting torque to move the latter rotor out of its position of rest. However, with such an arrangement, the non-synchronous unit would have to be relatively large and that unit would interfere with the synchronous speed of the synchronous motor unit after the latter has been started.

In accordance with the present invention, the starting torque of the non-synchronous motor unit is not strong enough, if the two rotors were directly connected, to pull the toothed rotor out of locked stationary position, and a loose coupling arrangement is provided between these rotors of such nature as to allow the rotor 22 to start without being under a load and then, after it has acquired momentum, give to the toothed rotor a blow which will jerk it out of stationary position. This loose connection also includes means for bringing the parts to a position, after they have been brought to rest, where, when the non-synchronous motor is again started, the loose connection will be effective to start the synchronous motor unit. This loose connection is shown for illustrative disclosure as including two members in the form of pins 30 and 31 fixedly associated with the respective rotors 22 and 13 and so arranged that, after the non-synchronous motor unit is started, the pin 30 will strike and pick up the pin 31. In the embodiment shown in Fig. 1, these pins are respectively carried by disks 32 and 33 which, in turn, are respectively fixed to the shafts 23 and 15. In the embodiment shown in Figs. 2 to 4, these pins are respectively connected directly to the rotors 22 and 13. Between the disks, and normally urging them in a direction to disengage the pins, is a very light spring 35. In the embodiment shown in Fig. 1, this spring has its opposite ends connected to the disks 32 and 33 while, in the embodiment shown in Figs. 2 to 4, the spring is in the form of a coil, the ends of which engage the pins.

In the embodiment shown in Fig. 5, the pins 30 and 31 are carried by wheels or gears 32' and 33' respectively. The gears 32' and 33' respectively mesh with pinions 41 and 42 which in turn are respectively connected to the rotors 22 and 13. The reduction gearing between the rotors and the respective gears may be in the ratio of six to one.

In the embodiment shown in Fig. 6, the pin 31 is carried by the toothed rotor 13, as in the embodiment shown in Fig. 2, but the pin 30 is carried by a gear 43 which meshes with a pinion 44 fixed to, so as to rotate with, the non-synchronous rotor 22.

The operation of my improved arrangement is briefly as follows: Assuming that the parts are in the position of rest, as shown in the drawing, when the current is thrown onto the motor, the rotor 22, having relatively strong starting characteristics, will rotate and, after it has acquired momentum, the pin 30 will strike the pin 31, thereby giving a light hammer blow, so to speak, to the toothed rotor 13 so as to jerk that rotor from its state of rest. After the synchronous motor has reached synchronous speed, it will, due to the synchronous characteristics of that motor, retain that speed and, while the pins 30 and 31 may remain substantially in engagement, the torque of the induction rotor will not interfere with the synchronous speed of the other unit. After the current is thrown off, the spring 35 will disengage the pins, that is angularly move them apart, so that, when the motor is again started, the pin 30 will move an appreciable distance before picking up the pin 31 and result in starting of the toothed rotor 13.

In the embodiment shown in Fig. 5, the non-synchronous rotor 22 may make a number of revolutions, say six, before the pins engage, and thus this rotor may assume full speed before it performs its function. With this arrangement, the non-synchronous motor unit may be less powerful than in the preceding embodiment and, therefore, is less apt to interfere with the synchronous speed of the synchronous unit during the normal operation of the mechanism.

With the embodiment shown in Fig. 6, the operation is generally similar to that described in connection with the preceding embodiments. In this case, the rotor 22 of the non-synchronous unit makes more than one revolution and, therefore, acquires considerable momentum before the pin 30 engages the pin 31; also, during the normal operation of the device, the wheel or gear 30 more closely approximates the speed of the toothed rotor 13 and, in view of these facts, the induction motor can be of less power than in the preceding embodiment. Assuming that the non-synchronous motor unit tries to go nearly 1800 R.P.M., while the synchronous motor unit goes 360 R.P.M., the ratio between the pinion 42 and the gear 43 may be in the nature of five to one or four to one. In case the ratio of four to one is adopted, the induction motor, during the normal operation of the mechanism, will always pull slightly on the shaft 15, but this pulling force is unable to pull the toothed rotor out of synchronism.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a synchronous motor unit having a resistance to starting and a strong synchronizing characteristic, a non-synchronous motor unit having a starting torque which is less than the direct force necessary to move the rotor of the first unit from a state of rest, the lagging or leading characteristic of the non-synchronous motor being relatively negligible as compared with the strong synchronizing characteristic of the synchronous motor, each of said units having a rotor capable of rotative movement but fixed against axial movement, and a coupling between said rotors having a lost motion connection comprising a pair of members fixedly associated with the respective rotors, the member associated with the rotor of the non-synchronous unit being arranged to engage and deliver a blow to the other member after the rotor of the non-synchronous motor starts rotating.

2. In combination, a synchronous motor unit having a resistance to starting and a strong synchronizing characteristic, a non-synchronous motor unit having a starting torque which is less than the direct force necessary to move the rotor of the first unit from a state of rest, the synchronizing characteristic of the non-synchronous motor being relatively negligible as compared with the strong synchronizing characteristic of the synchronous motor, each of said units having a rotor capable of rotative movement but fixed against axial movement, a pin fixedly associated with the rotor of the synchronous unit, and a pin fixedly associated with the rotor of the second unit and adapted to engage and impart a blow to the first pin after the second unit has developed a predetermined rotary velocity.

3. In combination, a sychronous motor unit having a resistance to starting and a strong synchronozing characteristic, a non-synchronous motor unit having a starting torque which is less than the direct force necessary to move the rotor of the first unit from a state of rest, the synchronizing characteristic of the non-synchronous motor being relatively negligible as compared with the strong synchronizing characteristic of the synchronous motor, each of said units having a rotor capable of rotative movement but fixed against axial movement, a coupling between said rotors having a lost motion connection comprising a pair of members fixedly associated with the respective rotors, the member associated with the rotor of the non-synchronous unit being arranged to engage and deliver a blow to the other member after the rotor of the non-synchronous motor starts rotating, and a light spring for separating said members when the units are at rest.

MAX KNOBEL.